US000001215H

United States Statutory Invention Registration [19]

[11] Reg. Number: H1215

Schabdach et al. [43] Published: Aug. 3, 1993

[54] DOUBLE SHOT GRENADE LAUNCHER

[75] Inventors: Paul G. Schabdach, Churchville; Irving F. Barditch, Baltimore, both of Md.

[73] Assignee: The United States of America as represented by the Secretary of the Army, Washington, D.C.

[21] Appl. No.: 736,264

[22] Filed: Jul. 3, 1991

[51] Int. Cl.[5] ..... F41A 19/69

[52] U.S. Cl. ..... 102/206

*Primary Examiner*—Michael J. Carone

*Attorney, Agent, or Firm*—Anthony T. Lane; Edward Goldberg; Michael C. Sachs

[57] ABSTRACT

A NBC hardened double shot grenade launcher utilizes a latching relay and RC delays to sequentially activate two secondary relays. The delays keep the latching relay from operating until a relay switch transfers supply voltage to enable firing of double the number of salvos without modification of the original supply line.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOUBLE SHOT GRENADE LAUNCHER

GOVERNMENTAL INTEREST

The invention described herein may be manufactured, used and licensed by or for the Government for Governmental purposes without the payment of any royalties thereon.

BACKGROUND OF THE INVENTION

Currently the M2 Bradley Fighting Vehicle has two 4-tube smoke grenade dischargers mounted on the outside of the vehicle. One of the dischargers is mounted on the left side of the vehicle and the other on the right side of the vehicle. There is an arming switch and a fire control button on the inside of the vehicle which the operator can readily reach. After the operator arms the system, which is nothing more than throwing a toggle switch, a +24 volts direct current potential is applied to one side of a fire control push button. This push button is then depressed to close the circuit and send the +24 VDC unto two discharger activate wires. One of the activate wires goes to the left 4-tube discharger unit and the other activate wire goes to the right side 4-tube discharger unit.

The problem with these prior art grenade smoke dischargers was that they did not provide sufficient smoke screening capability for the threat under consideration. The new requirement necessitated a doubling of the capacity without changing the existing control wiring harness or the control box and that the system be nuclear, biological and chemical hardened. Doubling the capacity to meet the new threat required the prior art existing 8 launch tubes (4 left and 4 right) to be fired as salvo A, and a second group of 4 left and 4 right to be fired as salvo B. The retrofit condition specified that both salvos A and B must be controlled using only the existing single supply wire.

SUMMARY OF THE INVENTION

The present invention relates to a double shot grenade launcher system that is not only reliable, inexpensive and NBC hardened, but one which can be readily implemented in the field by service personnel.

The present invention attaches to the base of an existing discharger and mates with existing discharger recepticles plug. The existing wiring harness plugs directly into the present invention. An additional receptacle is provided for attaching the wiring harness plug from the new 4-tube discharger. The existing discharger is defined as salvo A. The new discharger will be defined as salvo B. An identical system, to be further described hereinafter, is provided to a discharger on the other side of the vehicle.

An object of the present invention is to provide for a doubling of the grenade launch capability of a Bradley Fighting Vehicle using only the existing single supply wire.

Another object of the present invention is to provide for a doubling of the grenade launch capability of a Bradley Fighting Vehicle which can be reliably installed by troop field service personnel.

A further object of the present invention is to provide for a doubling of the grenade launch capability of a Bradley Fighting Vehicle which is inexpensive and NBC hardened.

For a better understanding of the present invention, together with other and further objects thereof, reference is made to the following descriptions taken in connection with the accompanying drawing.

DETAILED DESCRIPTION OF THE PREFERRED EMBODIMENTS

Figure 1:
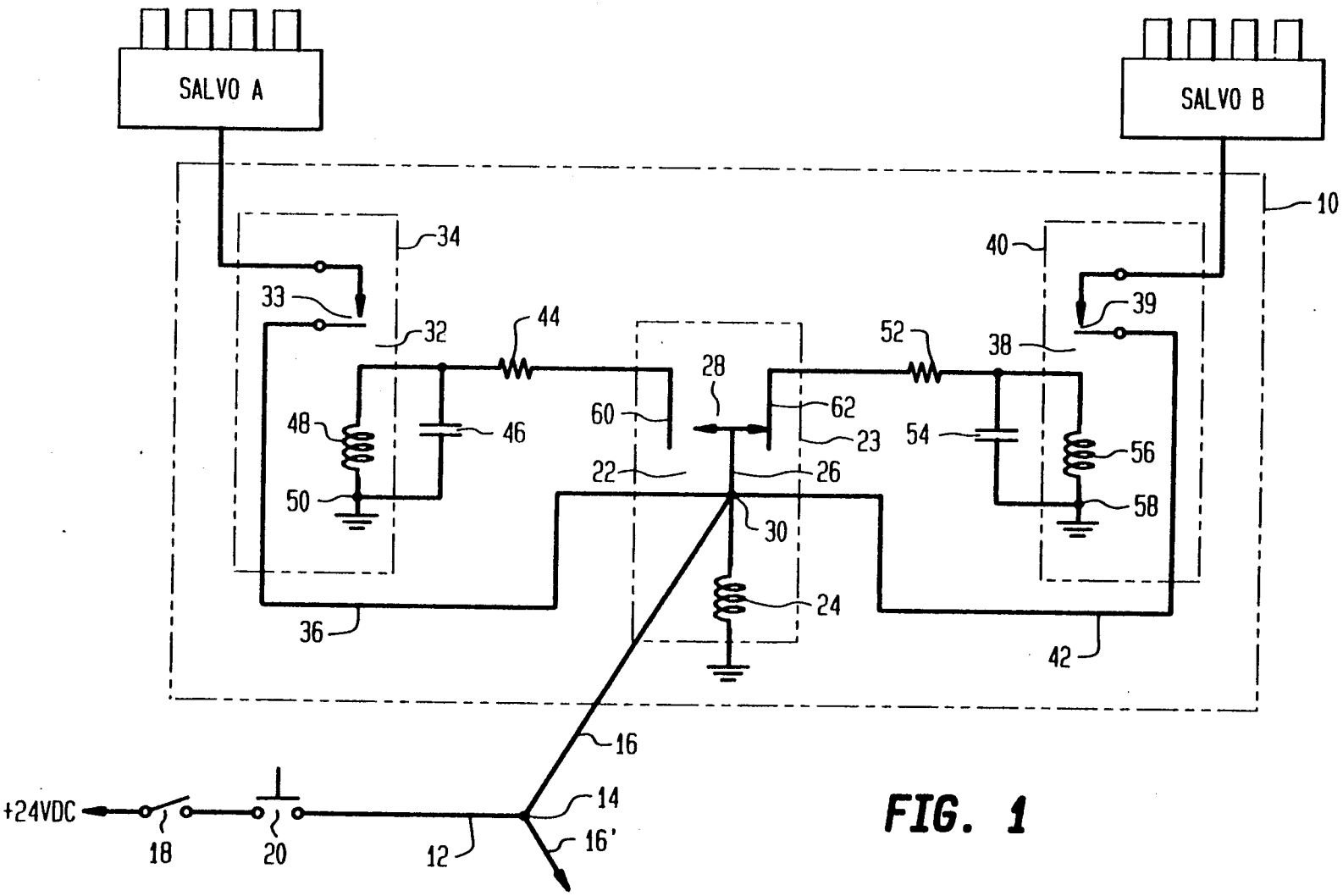
FIG. 1 is a schematic representation of the mechanical and electrical components of the invention showing their relative relationships.

Referring now to FIG. 1, a nuclear, biological, chemical impervious hermetically sealed container, as shown schematically by the dashed line box 10, connects to the existing wiring harness supply conductor 12 at junction 14. The existing discharger is labeled salvo A and the new additional discharger is identified as salvo B. An identical set up is provided to the dischargers on the other side of the vehicle via alternate supply conductor 16 but is not shown because it would be redundant. A normally open arm switch 18 is connected on one end to the 24 VDC power source and on its other end is in series with a normally open fire control button switch 20. The relay containing NBC junction box 10 is connected to supply conductor by means of conductor 16. The 24 VDC potential is connected to the circuit in four places. A latching relay 22 contained within dashed box 23 is connected to the 24 VDC at one end of its coil 24 with the other end of coil 24 connected to ground. The center leg 26 of the latching relay switch 28 is also connected to the supply voltage at junction point 30. The normally open contacts of salvo A relay 32 are contained within dashed box 34 and connected to the 24 VDC supply by means of conductor 36. In a similar fashion the normally open contacts of salvo B relay 38 are contained within the dashed box 40 and connected to the 24 VDC supply at junction 30 by means of electrical conductor 42. In series with the normally open contact of latching relay switch 28 is a limiting resistor 44 which is connected on its other end to a capacitor 46 which is turn conntected in parallel with the coil 48 of salvo A relay 32. The other ends of coil 48 and capacitor 46 are connected at junction 50 to ground. In a similar fashion, in series with the normally closed contact of latching relay switch 28 is an RC delay for salvo B relay 38. A resistor 52 is connected to the junction of capacitor 54 which is in parallel connection with coil 56 of salvo B relay 38. The other ends of coil 56 and capacitor 54 are connected at junction 58 to ground.

In operation, when the arm switch 18 is closed and fire push button 20 is actuated, latching coil 24 of latching relay 22 is energized causing the center leg 26 of the latching switch 28 to transfer or toggle to the other contacts, either contact 60 or contact 62. This will provide a path for the +24 VDC to travel to the secondary relays 32 and 38 through the RC networks of resistor 44 and capacitor 46 or resistor 52 and capacitor 54. The RC network causes a slight delay which is most important in the operation of the relay being energized. The amount of the delay is determined by the resistance and capacitance values selected. When the secondary relays 32 or 38 operate the normally open contacts 33 and 39 respectively close sending the +24 VDC fire voltage to the launch tubes of either salvo A or salvo B, with a delay.

The secondary relays and time delays are necesssary because as previously stated there is only one energized supply conductor. This single supply line must be used for both relay operation and fire current. As the latching relay 22 is operated, the closed side of the switch 60 or 62 sees +24 VDC for a split second before the switch transfers. This split second delay is enough time to fire that particular salvo before the switch transfers and fires the next salvo. The RC delay keeps that salvo relay from operating until the latching switch transfers to the opposite side which is the heart of the invention.

While a specific embodiment of the invention has been shown and described in detail to illustrate the application of the principles of the invention, it will be understood that the invention may be embodied otherwise without departing from such principles.

What is claimed is:

1. A double shot grenade launcher which comprises:

container means for holding electrical components therein;

latching relay means operatively disposed in said container means for switching a single supply voltage to two alternate locations;

first secondary relay means operatively connected to said latching relay means for firing a first salvo from said grenade launcher;

first RC delay means electrically connected intermediate said latching relay means and said first secondary relay means for providing enough time to fire said first salvo before said latching relay means transfers to fire a second salvo;

second secondary relay means operatively connected to said latching relay means for firing said second salvo from said granade launcher; and second RC delay means electrically connected intermediate said latching relay means and said second secondary relay means for providing enough time to fire said second salvo and keeping said second relay from operating until said latching means transfers.

2. A double shot grenade launcher is recited in claim 1 wherein said container means includes a hermetically sealed box hardened to resist nuclear, biological and chemical environments.

3. A double shot grenade launcher as recited in claim 2 wherein said latching relay means includes;

a latching coil electrically coupled intermediate said supply voltage and ground; and a latching switch operable by said coil for transfering supply voltage to either said first or second secondary relay means.

4. A double shot grenade launcher as recited in claim 3 wherein said first secondary relay means includes;

a first relay coil electrically coupled to said first RC delay means, and a first normally open switch operably coupled to said first relay coil and to function when said first relay coil is energized.

5. A double shot grenade launcher as recited in claim 4 wherein said first delay means includes;

a first resistor electrically coupled intermediate said latching switch and said first secondary relay means; and a first capacitor electrically coupled in parallel with said first relay coil of said first secondary relay means.

6. A double shot grenade launcher as recited in claim 5 wherein said second relay means includes;

a second relay coil electrically coupled to said second RC delay means; and a second normally open switch operably coupled to said second relay to function when said second relay coil is energized.

7. A double shot grenade launcher as recited in claim 6 wherein said second delay means includes;

a second resistor electrically coupled intermediate said latching switch and said second secondary relay means; and a second capacitor electrically coupled in parallel with said second relay coil of said second secondary relay means.

* * * * *